United States Patent [19]
Mattern, Jr. et al.

[11] Patent Number: 5,586,847
[45] Date of Patent: Dec. 24, 1996

[54] POWER TOOL ADAPTER

[76] Inventors: Charles J. Mattern, Jr., 309 Bank Ave. No. A2; Lawrence G. Tatum, Taylors La. Farm, both of Riverton, N.J. 08077

[21] Appl. No.: 466,838
[22] Filed: Jun. 6, 1995
[51] Int. Cl.$^6$ .......................... B23B 51/12; B23B 31/22
[52] U.S. Cl. ................. 408/239 A; 7/158; 7/165; 279/75; 279/145
[58] Field of Search .................... 279/143–145, 279/75; 408/239 R, 239 A; 7/158, 165

[56] References Cited

U.S. PATENT DOCUMENTS

| | | | |
|---|---|---|---|
| 1,468,732 | 9/1923 | Bradbury . | |
| 1,860,998 | 5/1932 | Drazick . | |
| 1,873,173 | 8/1932 | Anderson . | |
| 3,633,931 | 1/1972 | Bilz | 279/75 |
| 3,735,993 | 5/1973 | Seibert | 279/1 B |
| 3,973,784 | 8/1976 | Smith | 279/1 A |
| 4,525,111 | 6/1985 | Gutsche | 408/239 A |
| 4,573,839 | 3/1986 | Finnegan | 408/239 R |
| 4,692,073 | 9/1987 | Martindell | 408/239 A |
| 4,796,319 | 1/1989 | Taft | 7/158 |
| 4,900,202 | 2/1990 | Wienhold | 408/240 |
| 5,062,749 | 11/1991 | Sheets | 279/75 |
| 5,129,118 | 7/1992 | Walmesley | 7/158 |
| 5,191,666 | 3/1993 | Corbin | 7/158 |
| 5,313,680 | 5/1994 | Ringler | 7/158 |
| 5,470,180 | 11/1995 | Jore | 408/239 R |

FOREIGN PATENT DOCUMENTS

| | | | |
|---|---|---|---|
| 0304002A1 | 2/1989 | European Pat. Off. | 408/239 R |
| 250487 | 10/1987 | Germany | 279/75 |

OTHER PUBLICATIONS

Photocopy of p. 63 of Malco® catalog, "Power Bits & Inserts", see *Hex Adaptor and Magnetic Bit Holder* (admitted prior art).
2 photocopies of packaging for Makita, *Quick Chuck* (admitted prior art).

*Primary Examiner*—Steven C. Bishop
*Attorney, Agent, or Firm*—Panitch Schwarze Jacobs & Nadel, P.C.

[57] ABSTRACT

A power tool adapter which can be quickly connected and disconnected to a first power-driven rotary bit having an outer periphery includes an inner sleeve having a first end and a second end. The first end includes an opening for accessing a cavity within the inner sleeve. The sleeve includes at least one radially extending opening. The cavity is sized to complementarily receive at least a portion of the first bit. The first bit is rotatably fixed to the inner sleeve. The second end of the inner sleeve receives at least a portion of a second rotary bit. A locking mechanism is operatively engaged with the inner sleeve. An outer sleeve having a cavity slidably receives at least a portion of the inner sleeve. The outer sleeve is movable from a first position, wherein the outer sleeve maintains the locking mechanism in engagement with the first bit to lock the first bit to the inner sleeve, in a first direction to a second position wherein the locking mechanism is disengaged from the first bit to permit the first bit to be removed from the cavity of the inner sleeve, and from the first position in a second direction to a third position wherein the locking mechanism is removable from the cavity of the inner sleeve to permit the first bit to be installed into the cavity of the inner sleeve. The outer sleeve is biased toward the first position.

19 Claims, 5 Drawing Sheets

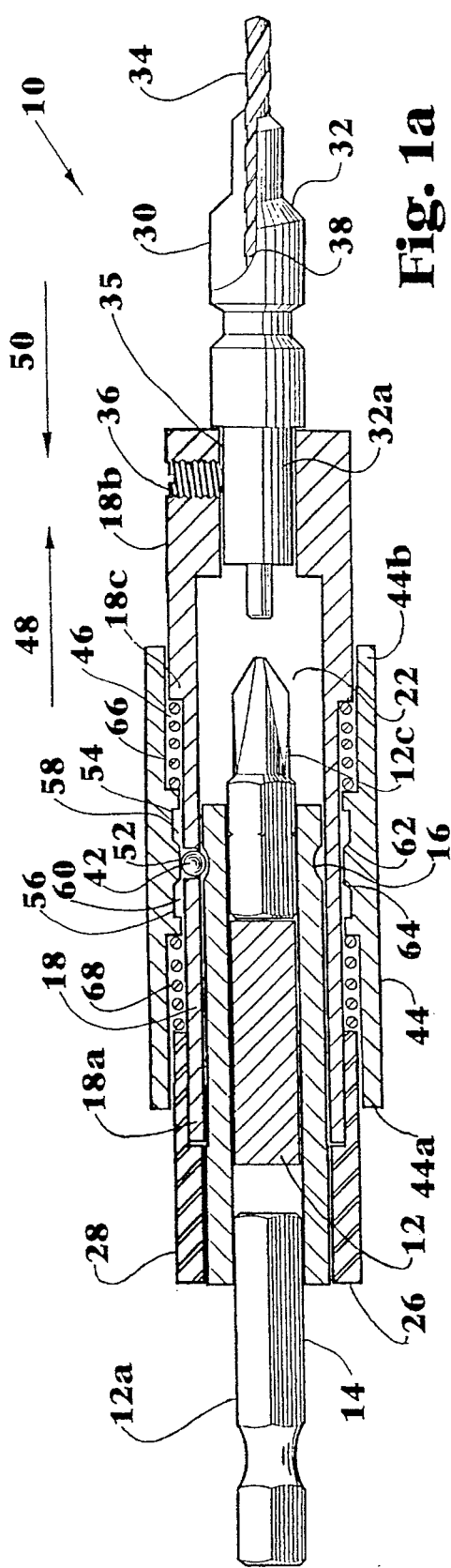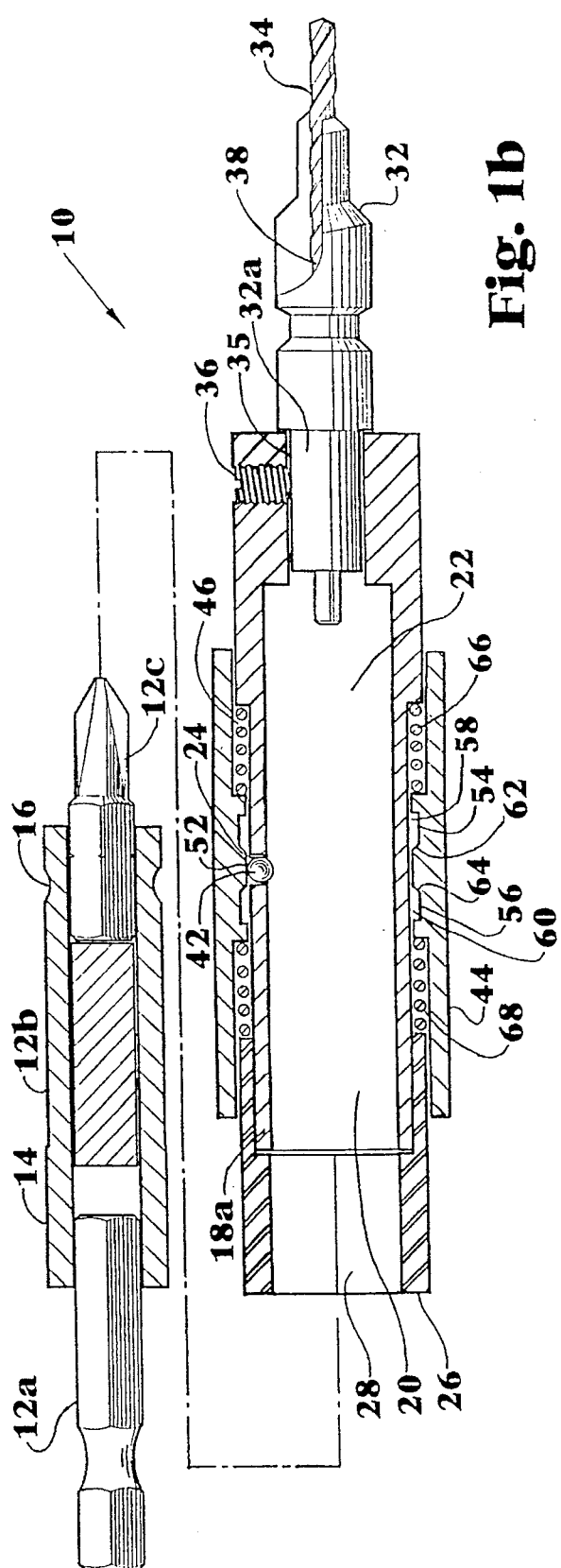

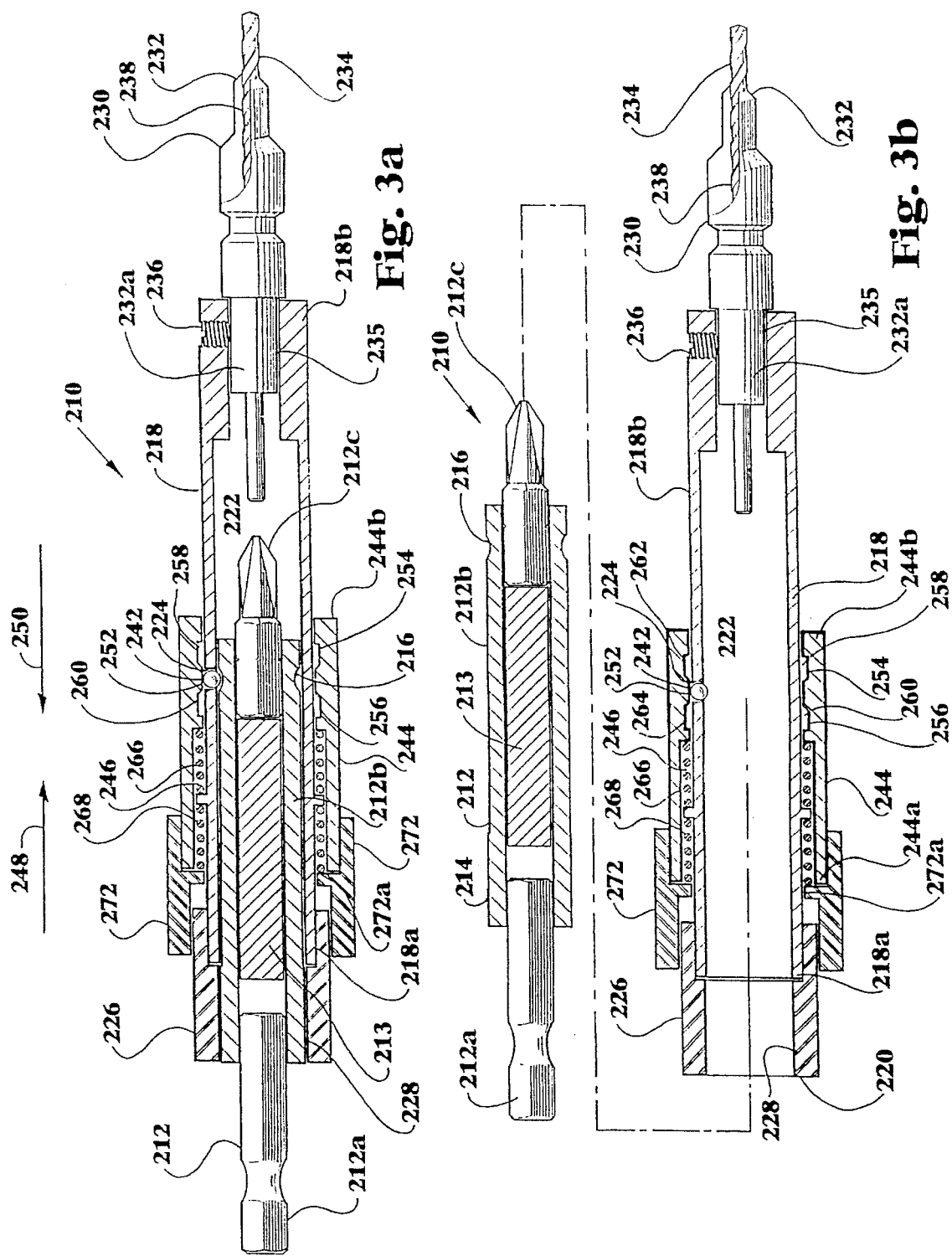

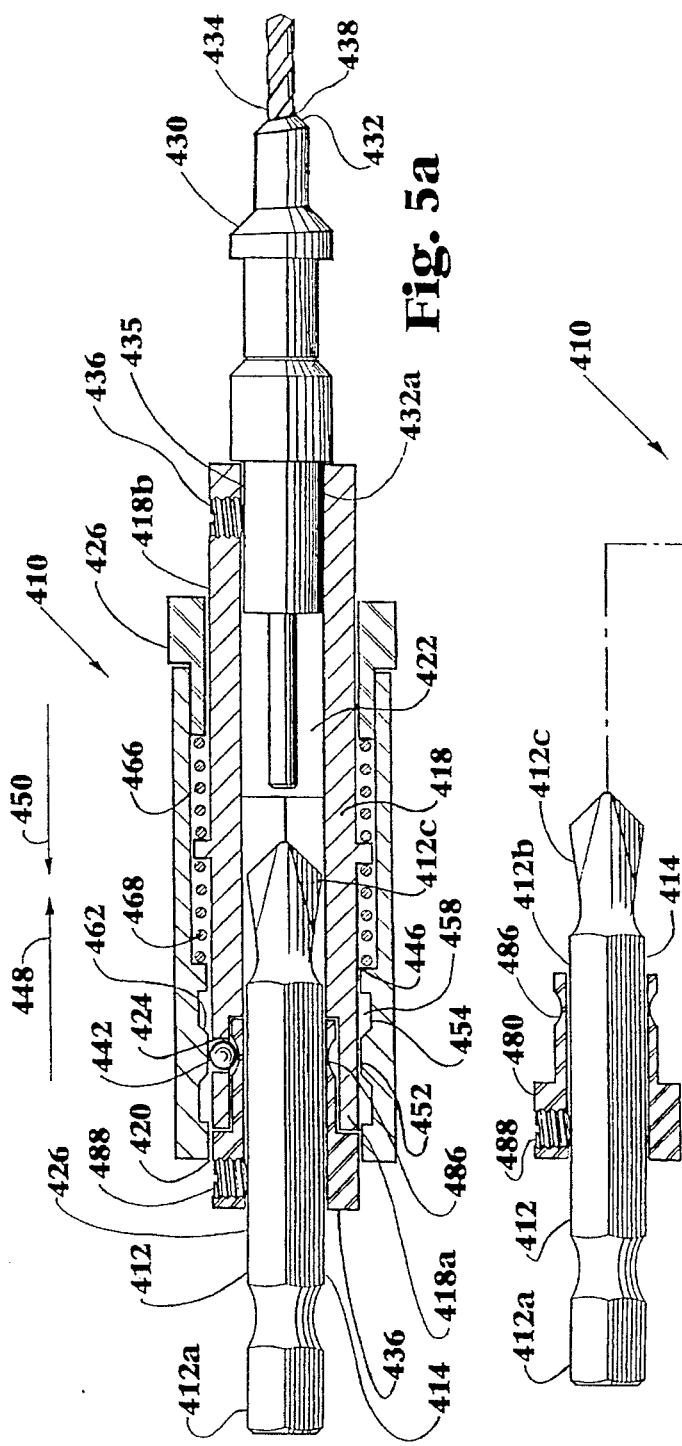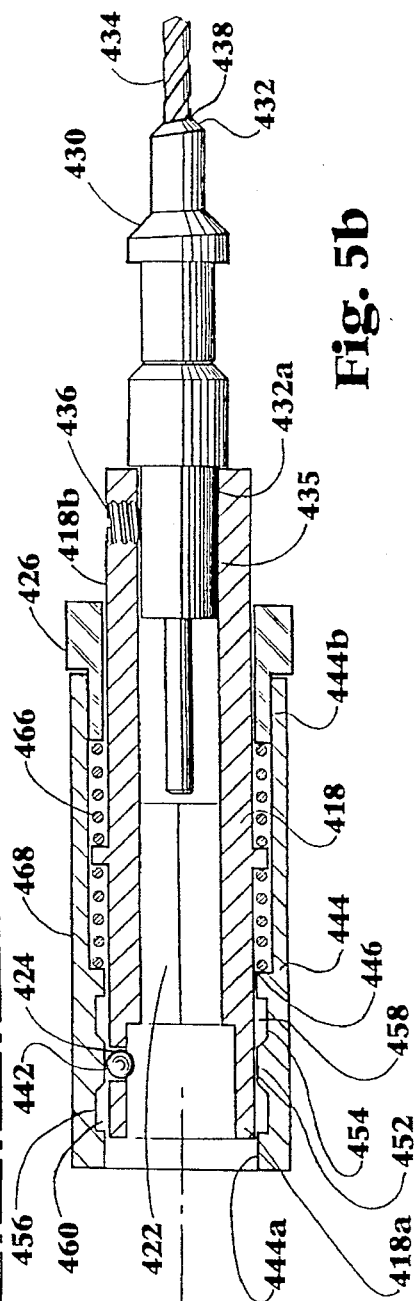

5,586,847

POWER TOOL ADAPTER

FIELD OF THE INVENTION

The present invention relates to accessories for use on power tools and, more particularly, to a power tool adapter for being quickly connected and disconnected to a power-driven rotary bit.

BACKGROUND OF THE INVENTION

In many cases, a craftsman is required to fit a series of screws in a workpiece, but must pre-drill tap holes in the workpiece to enable rapid and true driving of the screws. This necessity occurs frequently in woodworking, for example in fixing molding around a door, assembling cabinetry, or hanging a door. Sheet metal workers also must pre-drill screw holes essentially every time a piece of sheet metal is affixed to backing with screws, for example when installing a metal roof. Tap holes are also drilled in plastic, plaster and other materials of construction prior to setting of screws. In some cases, when it is important to have the head of the screw flush with or slightly below the surface of the workpiece, a power tool may be used, either instead of, or in addition to, the tap hole drill.

In practice, as a craftsman moves along a workpiece, it is necessary for him to first drill (or countersink) a tap hole, and then drive the screw; then he moves to an adjacent location and repeats the drill/screw sequence. He must either repeatedly change the bit in the power tool from drill bit to screwdriver bit, or he must have two, or, if a countersink is to be used in addition to the drill bit, three power tools, each equipped with a different bit. In many cases, it is not convenient to have multiple power tools, and the constant changing of the bits is unduly time consuming and burdensome.

To overcome the problem of using many tools, there are many devices employed for removably securing a tool implement to a tool body or drive mechanism. These devices usually involve threadably interlocked adapter parts or devices which secure the tool implement with set screws, or the like, to the tool body. While these means are effective in accomplishing the ultimate result of securing the tool implement, they are not ideal, for a relatively large amount of time is lost and skill is necessary to properly engage and disengage these adapter devices. That is, it is often necessary for even the most dexterous person to use two hands to remove or attach the tool implement. Also, separate tools, some made especially for the adapter device, may be necessary to properly engage and disengage these devices.

Moreover, such conventional adapter devices do not firmly lock to the tool body and often become uncoupled from the tool body during use. For instance, conventional adapter devices often become uncoupled from the tool body when the adapter device is coupling a drill bit to the tool body which is to be used to drill wood. Drill bits often become bound up in the wood workpiece, resulting in the adapter device uncoupling from the tool body. This can result in significant down time to unbind the adapter device from the workpiece and again couple it to the tool body.

A need has arisen for a power tool adapter which can be quickly connected and disconnected to a power driven rotary bit in a simple and efficient manner with a single hand and yet firmly lock the adapter to the power driven bit. Such an adapter would allow a craftsman to easily change working bits with a single hand in workplaces, such as on the top of a ladder, where it is difficult to use two hands to make the necessary working bit change without fear of the adapter becoming uncoupled from the bit.

The present invention resulted from the inventors' observation of these problems, and their successful efforts to solve them. The present invention, therefore, is directed toward a power tool adapter which can be quickly connected and disconnected to a power-driven rotary bit with a single hand.

SUMMARY OF THE INVENTION

Briefly stated, the present invention is a power tool adapter which can be quickly connected and disconnected to a first power driven rotary bit. The first bit has an outer periphery. The adapter includes an inner sleeve having a first end and a second end. The first end includes an opening for accessing a cavity within the inner sleeve. The sleeve includes at least one radially extending opening. The cavity is sized to complementarily receive at least a portion of the first bit. The first bit is rotatably fixed to the inner sleeve. The second end of the inner sleeve receives at least a portion of a second rotary bit. A locking mechanism is operatively engaged with the inner sleeve. An outer sleeve includes a cavity which slidably receives at least a portion of the inner sleeve therein. The outer sleeve is movable from a first position, wherein the outer sleeve maintains the locking mechanism in engagement with the first bit to lock the first bit to the inner sleeve, in a first direction to a second position wherein the locking mechanism is disengaged from the first bit to permit the first bit to be removed from the cavity of the inner sleeve. The outer sleeve is also movable from the first position in a second direction to a third position wherein the locking mechanism is removable from the cavity of the inner sleeve to permit the first bit to be installed into the cavity of the inner sleeve. The outer sleeve is biased toward the first position.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1a is a partial cross-sectional view of a power tool adapter in accordance with a first preferred embodiment of the invention;

FIG. 1b is an exploded, partial cross-sectional view of the power tool adapter shown in FIG. 1a;

FIG. 2b is an exploded, partial cross-sectional view of the power tool adapter shown in FIG. 2a;

FIG. 3a is a partial cross-sectional view of a power tool adapter in accordance with a third preferred embodiment of the invention;

FIG. 3b is an exploded, partial cross-sectional view of the power tool adapter shown in FIG. 3a;

FIG. 4b is an exploded, partial cross-sectional view of the power tool adapter shown in FIG. 4a;

FIG. 5a is a partial cross-sectional view of a power tool adapter in accordance with a fifth preferred embodiment of the invention; and FIG. 5b is an exploded, partial perspective view of the power tool adapter shown in FIG. 5a.

DETAILED DESCRIPTION OF PREFERRED EMBODIMENTS

Figure 2A:
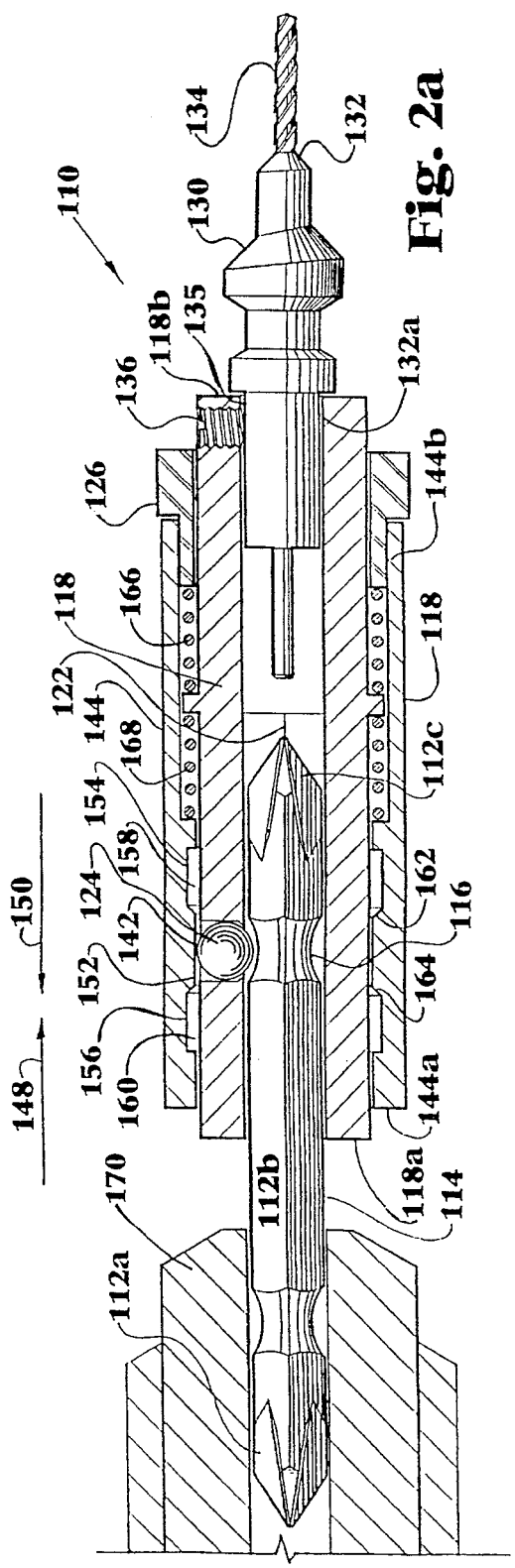
FIG. 2a is a partial cross-sectional view of a power tool adapter in accordance with a second preferred embodiment of the invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the power tool adapter and designated parts thereof. The terminology includes the words above specifically mentioned, derivatives thereof and words of similar import.

Referring to the drawings, wherein like numerals indicate like elements throughout, there is shown in FIGS. 1a and 1b a first preferred embodiment of a power tool adapter 10, in accordance with the present invention. The adapter 10 can be quickly connected and disconnected to a first power-driven rotary bit 12. As used herein, the term "power" is meant to encompass manually or hand-driven tools, as well as motor-driven tools. The first bit 12 preferably includes an outer periphery 14, wherein a portion of the outer periphery 14 is generally hexagonally shaped in cross section. More particularly, the first bit 12 is preferably a power-driven rotary screwdriver bit, of the Phillips type, although it is understood by those skilled in the art that other driving heads could be used, such as a flat or star-head, without departing from the spirit and scope of the invention. The particular shape of the outer periphery 14 of the first bit 12 is not pertinent to the present invention, as described in more detail hereinafter.

As best shown in FIG. 1a, the first bit 12 includes a shaft portion 12a which is secured within a chuck of a power tool (not shown), in a manner well understood by those skilled in the art. The first bit 12 further includes an intermediate portion 12b which is preferably magnetized and includes an aperture at its distal end for receiving a replaceable drive bit 12c, in a manner well understood by those skilled in the art. The proximal end (i.e., the end adjacent the shaft portion 12a) of the intermediate portion 12b is preferably hexagonally shaped in cross section for reasons described hereinafter.

It is understood by those skilled in the art that the first bit 12 is not limited to any particular shape or type of screwdriver bit. For instance, the first bit 12 could be of the standard type, without a replaceable drive bit. Furthermore, the first bit 12 could be a cutting tool, such as a drill bit (not shown) or countersink, without departing from the spirit and scope of the invention.

The first bit 12 and the remaining elements of the adapter 10 are preferably constructed of a high-strength material, such as stainless steel, although other materials, such as aluminum, could be used, as recognized by those skilled in the art from this disclosure.

As shown in FIG. 1b, the outer periphery 14 of the first bit 12 includes a recess 16. The recess 16 is preferably located proximate the distal end of the intermediate portion 12b of the first bit 12. The recess 16 is generally in the form of an annular groove, which is arcuate in cross section.

Referring now to FIG. 1b, the adapter 10 further includes an inner sleeve 18 having a first end 18a and a second end 18b. The first end 18a includes an opening 20 for accessing a cavity 22 within the inner sleeve 18. The inner sleeve 18 includes at least one radially extending opening 24.

The cavity 22 is sized to complementarily receive at least a portion of the first bit 12 such that the radially extending opening 24 is generally aligned with the recess 16 in the first bit 12. More particularly, the cavity 22 receives at least the intermediate portion 12b and drive bit 12c of the first bit 12, as best shown in FIG. 1a. It is understood by those skilled in the art from this disclosure, that the portion of the first bit 12 which extends into the cavity 22 be sufficiently large so that the inner sleeve 18 is securely mounted on the first bit 12. It is also understood by those skilled in the art from this disclosure that the particular location of the recess 16 along the first bit 12 is not pertinent to the present invention as long as the recess 16 is aligned with the radially extending opening 24.

The first bit 12 is rotatably fixed to the inner sleeve 18 such that rotation of the first bit 12 causes corresponding rotation of the inner sleeve 18. The first bit 12 is rotatably fixed to the inner sleeve 18 because of an end cap 26 which is fitted over the first end 18a of the inner sleeve 18 with an interference fit. However, it is understood by those skilled in the art from this disclosure that the end cap 26 can be secured to the first end 18a of the inner sleeve 18 in other manners, such as with a threaded connection or through the use of an adhesive (not shown). The end cap 26 has a through bore 28 which receives the proximal end of the intermediate portion 12b of the first bit 12. The proximal end of the intermediate portion 12b of the first bit 12 is generally hexagonally shaped in cross section. Similarly, the bore 28 is also hexagonally shaped to correspondingly receive the hexagonal proximal end of the intermediate portion 12b of the first bit 12 such that the first bit 12 and inner sleeve 18 are rotatably fixed together.

While it is preferred that the first bit 12 be rotatably fixed to the inner sleeve 18 via the hexagonal mating surfaces between the intermediate portion 12b of the first bit 12 and the bore 28 of the end cap 26, it is understood by those of ordinary skill in the art that the first bit 12 can be rotatably fixed to the inner sleeve 18 in a number of manners, such as through a splined connection, a pentagon-shaped connection, or a tight friction fit.

The inner sleeve 18 is generally annular shaped in cross section throughout its entire length. However, it is understood by those of ordinary skill in the art from this disclosure that the inner sleeve 18 could be of other configurations or shapes without departing from the spirit and scope of the invention. Similarly, the inner sleeve 18 could be generally annular shaped in cross section over only a portion of its length.

The second end 18b of the inner sleeve 18 receives at least a portion of a second rotary bit 30. In the first preferred embodiment, the second bit 30 is a countersink 32 having a drill bit 34 at its distal end. The second end 18b of the inner sleeve 18 includes an opening 35 for receiving a mounting shaft 32a of the countersink 32 in a complementary manner. A first set screw 36 is provided in the second end 18b of the inner sleeve 18 to secure the countersink 32 within the opening 35 in the second end 18b of the inner sleeve 18. The countersink 32 includes a longitudinally extending bore 38 which receives the drill bit 34 in a releasably securable manner. That is, a second set screw 40 is provided in the countersink 32 for allowing the drill bit 34 to be changed. The countersink 32 and drill bit 34 are tools well understood by those skilled in the art. Accordingly, further description thereof is omitted for the purposes of convenience only, and is not limiting.

It is also understood by those skilled in the art that the present invention is not limited to the use of a screwdriver bit 12 within the inner sleeve 18 and a countersink 32 mounted on the second end 18b of the inner sleeve 18. That is, the countersink 32 could be disposed within the inner sleeve 18 and the screwdriver bit 12 could be mounted on the second end 18b of the inner sleeve 18. Furthermore, it is understood by those skilled in the art that the present invention is not limited to the use of any particular bit in any particular order. That is, instead of the countersink 32 being mounted on the second end 18b of the inner sleeve 18, a screwdriver bit or other tool (not shown) could be mounted on the second end 18b of the inner sleeve 18, without departing from the spirit and scope of the invention.

As shown in FIG. 1a, the adapter 10 includes a locking mechanism operatively engaged with the inner sleeve 18. More particularly, the locking mechanism is comprised of a locking ball 42 radially and slidably disposed within the radially extending opening 24 of the inner sleeve 18. The locking ball 42 preferably has a diameter which generally corresponds to the arcuate surface of the recess 16 in the first bit 12. In the first preferred embodiment, the locking mechanism includes a single locking ball 42. However, it is understood by those skilled in the art that a number of locking balls could be disposed within a corresponding number of radially extending openings in the inner sleeve 18 for cooperation with the recess 16 in the first bit 12. The size of the locking ball 42 and the recess 16 are selected such that when the locking ball 42 is positioned within the recess 16, the first bit 12 cannot be removed from the inner sleeve 18. That is, the locking ball 42 serves more than a detent function in that detents normally can be overcome by applying a sufficient separating force. Thus, in the first preferred embodiment, it is preferred that the locking mechanism firmly lock the first bit 12 within the inner sleeve 18 so that during use of the adapter 10, the adapter 10 will not become uncoupled from the first bit 12.

Referring now to FIG. 1b, the adapter 10 also includes an outer sleeve 44 having a cavity 46 slidably and rotatably receiving at least a portion of the inner sleeve 18 therein. The outer sleeve 44 is movable from a first position (shown in FIG. 1a), wherein the outer sleeve 44 maintains the locking mechanism in engagement with the first bit 12 to lock the first bit 12 to the inner sleeve 18, in a first direction, represented by the arrow 48, to a second position (not shown) wherein the locking mechanism is removable from the cavity 22 of the inner sleeve 18 to permit the first bit 12 to be removed from the cavity 22 of the inner sleeve 18. The outer sleeve 44 is also movable from the first position in a second direction, represented by the arrow 50, to a third position (not shown) wherein the locking mechanism is removable from the cavity 22 of the inner sleeve 18 to permit the first bit 12 to be installed into the cavity 22 of the inner sleeve 18.

More particularly, the outer sleeve 44 is movable from the first position, wherein the outer sleeve 44 maintains the locking ball 42 in a radially inward position with respect to the inner sleeve 18 such that the locking ball 42 is positioned within the recess 16 of the first bit 12, in the first direction 48 to the second position wherein the locking ball 42 is permitted to move to a radially outward position (not shown) with respect to the inner sleeve 18 to permit the locking ball 42 to be positioned away from the recess 16 in the first bit 12. Similarly, the outer sleeve 44 is movable from the first position in the second direction 50 to the third position wherein the locking ball 42 is permitted to move to a radially outward position with respect to the inner sleeve 18 to permit the locking ball 42 to be positioned outwardly from the cavity 22 of the inner sleeve 18.

The cavity 46 of the outer sleeve 44 is defined by an internal surface within the outer sleeve 44. The internal surface includes a locking surface 52, a first release surface 54 on one side of the locking surface 52 and a second release surface 56 on another side of the locking surface 52. The locking surface 52 is positioned radially inward with respect to the first and second release surfaces 54, 56. When the outer sleeve 44 is in the first position, the locking surface 52 is aligned with the radially extending opening 24 of the inner sleeve 18 to maintain the locking ball 42 in the radially inward position with respect to the inner sleeve 18 such that the locking ball 42 is firmly positioned within the recess 16 of the first bit 12. When the outer sleeve 44 is in the second position, the first release surface 54 is aligned with the radially extending opening 24 of the inner sleeve 18 such that the locking ball 42 is permitted to move to a radially outward position with respect to the inner sleeve 18 to permit the locking ball 42 to be positioned away from the recess 16 of the first bit 12 into a first release pocket 58. Similarly, the second release surface 56 is aligned with the radially extending opening 24 of the inner sleeve 18 such that the locking ball 42 is permitted to move to a radially outward position with respect to the inner sleeve 18 to permit the locking ball 42 to be positioned outwardly from the cavity 22 of the inner sleeve 18 in a second release pocket 60 when the outer sleeve 44 is in the third position. Thus, when the locking ball 42 is positioned in either of the first or second release pockets 58, 60 the first bit 12 is readily removable from and/or installable into the cavity 22 of the inner sleeve 18.

As shown in FIGS. 1a and 1b, a first cam surface 62 is located between the first release surface 54 and the locking surface 52 for camming the locking ball 42 between the radially inward and outward positions. A second cam surface 64 is located between the second release surface 56 and the locking surface 52 for camming the locking ball 42 between the radially inward and outward positions, as described in more detail hereinafter.

The outer sleeve 44 is biased toward the first position. In the first preferred embodiment, it is preferred that the outer sleeve 44 be biased toward the first position by at least one spring positioned between the inner and outer sleeves 18, 44 for biasing the outer sleeve 44 toward the first position. More particularly, it is preferred that first and second coil springs 66, 68, respectively, be disposed between the inner and outer sleeves 18, 44. The first coil spring 66 is disposed between a shoulder 18c formed on the outer periphery of the inner sleeve 18 proximate the second end 18b of the inner sleeve 18 and a shoulder formed by a bore in the second end 44b of the outer sleeve 44 such that the first coil spring 66 biases the outer sleeve 44 towards the first end 18a of the inner sleeve 18. Similarly, the second coil spring 68 is disposed over the first end 18a of the inner sleeve 18 and is abutted against a shoulder formed by the end cap 26 and a shoulder formed by a bore in the first end 44a of the outer sleeve 44. The second coil spring 68 biases the outer sleeve 44 toward the second end 18b of the inner sleeve 18.

The strength of the first and second coil springs 66, 68 is selected to be generally the same. In this manner, the first and second coil springs 66, 68 act to center the outer sleeve 44 with respect to the shoulder 18c of the inner sleeve 18 and the shoulder formed by the end cap 26. As a result, when the outer sleeve 44 is in this center position, it is in the first position described above wherein the locking surface 52 maintains the locking ball 42 in the recess 16 of the first bit 12.

To mount the adapter 10 on the first bit 12, the drive bit end 12c of the first bit 12 is disposed through the bore 28 in the end cap 26 until the intermediate portion 12b of the first bit 12 engages the locking ball 42. At this point, the user slides the outer sleeve 44 in the second direction 50 until the first release pocket 58 is located above the locking ball 42. The locking ball 42 is then forced outwardly along the first camming surface 62 until it is positioned within the first release pocket 58, thereby allowing the intermediate portion 12b of the first bit 12 to pass beyond the radially extending opening 24. Once the locking ball 42 is in the first release pocket 58, the user releases the outer sleeve 44. Upon releasing the outer sleeve 44, the second coil spring 68 forces the outer sleeve 44 in the first direction 48 and the first camming surface 62 will force the locking ball 42 downwardly into the radially extending opening 24 into engagement with the intermediate portion 12b of the drill bit 12. The locking ball 42 then travels or rolls along the outer periphery of the intermediate portion 12b until it falls within the recess 16 whereupon the first bit 12 will be locked in place within the inner sleeve 18 and the outer sleeve 44 is in the first position.

Once the necessary step is carried out with respect to the second bit 34 and it is time to use the first bit 12, the user grasps the outer sleeve 44 and pushes it in the first direction 48 to the second position where the recess 16 pushes the locking ball 42 outwardly or upwardly into the second release pocket 60 whereupon the first bit 12 is removed from the adapter 10 and used in a conventional manner. By allowing the outer sleeve 44 to move in the first direction 48 for removal of the adapter 10 and in the second direction 54 for attachment of the adapter 10, the adapter 10 of the first preferred embodiment is easily slipped on and off the first bit 12 with a single-handed efficient operation.

With the foregoing description and explanation of the adapter 10 shown in FIGS. 1a and 1b as background, the description of the second through fifth preferred embodiments of the invention will be described with respect to FIGS. 2a–2b, 3a–3b, 4a–4b and 5a–5b, respectively. In essence, each adapter illustrated in FIGS. 2a through 5b is similar to the adapter 10 illustrated generally in FIGS. 1a and 1b. For this reason, the last two digits of the identifying numbers of FIGS. 2a through 5b correspond generally to the two digits of the identifying numerals in FIGS. 1a and 1b. The entire descriptions of identical components, therefore, will not be repeated with respect to the embodiments of FIGS. 2a through 5b. Identifying numerals are included in the embodiments of FIGS. 2a through 5b for ease of reference during examination, though all elements identified are not described in detail.

Figure 2B:
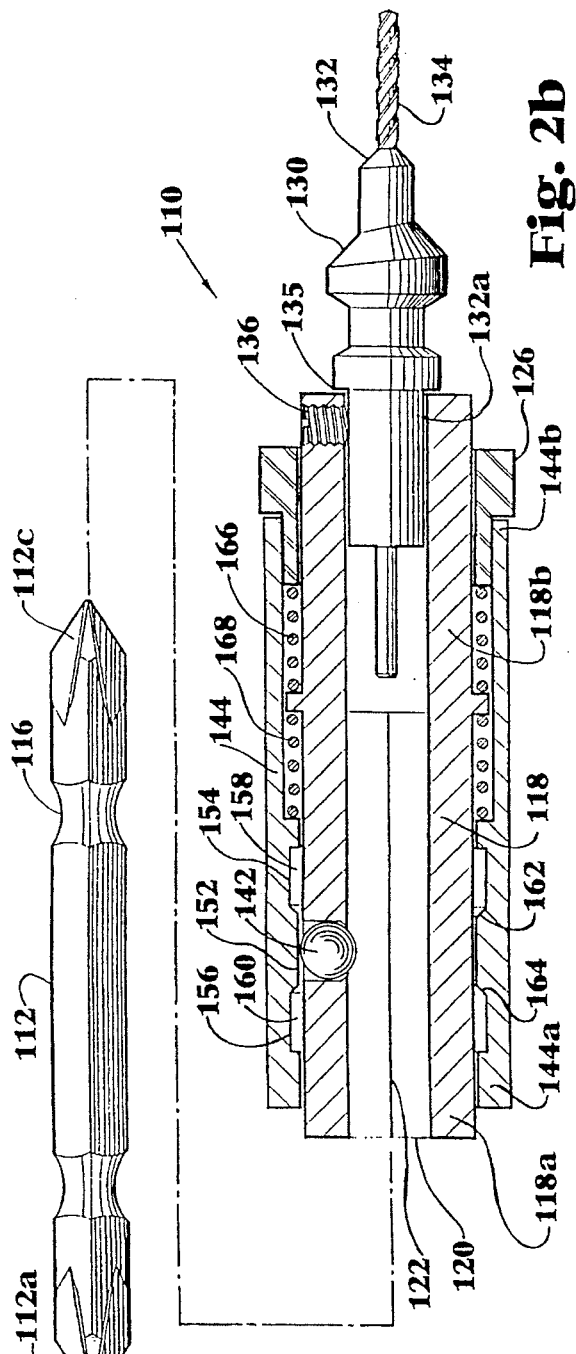

FIGS. 2a and 2b show a second preferred embodiment of the adapter 110. The adapter 110 in accordance with the second preferred embodiment is very similar to the adapter 10 in accordance with the first preferred embodiment, except that instead of the use of an end cap 26 on the proximal end of the inner sleeve 18 to retain the first and second coil springs 66, 68 between the inner and outer sleeves 18, 44, there is an end cap 126 disposed on the second end 144b of the outer sleeve 144. Furthermore, as opposed to placing the first and second coil springs 66, 68 on either side of the locking ball 42, the first and second coil springs 66, 68 are positioned adjacent to the locking ball 42 but achieve the same function. FIG. 2a further shows the use of a standard chuck 170 for holding the shaft portion 12a of the first bit 12.

The second preferred embodiment also shows a slightly different first bit 112 than that disclosed in connection with the first preferred embodiment. The first bit 112 shown in FIG. 2a is a simple screwdriver bit without having any means for replacing the tip portion and the shaft portion 112b is hexagonally shaped to cooperate with a correspondingly shaped cavity 122 of the inner sleeve 118.

Referring now to FIGS. 3a and 3b, there is shown an adapter 210 which is generally identical to the adapter 110 in accordance with the second preferred embodiment, except for the following differences. The first bit 212 is similar to the first bit 12 shown in connection with the first preferred embodiment, except that a magnet 213 within the intermediate portion 212b is shown. Furthermore, an intermediate end cap 272 is securely affixed to the first end 244a of the outer sleeve 244 and includes a inwardly projecting shoulder 272a which cooperates with the second coil spring 268.

Figure 4A:
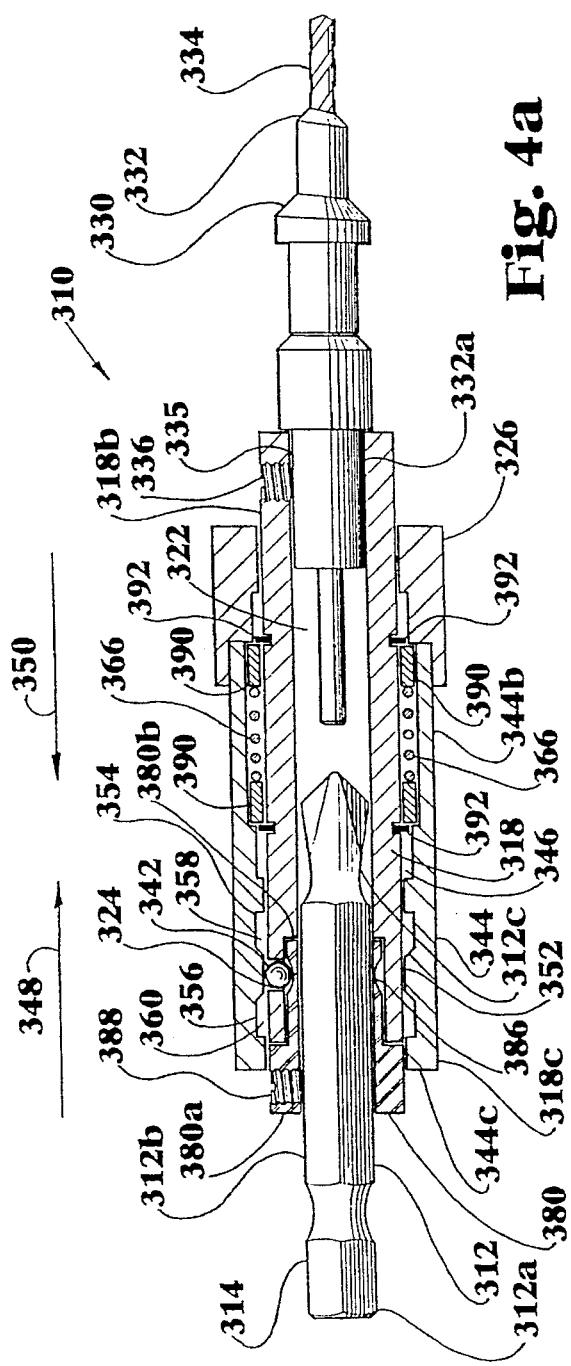
FIG. 4a is a partial cross-sectional view of a power tool adapter in accordance with a fourth preferred embodiment of the invention.
Figure 4B:
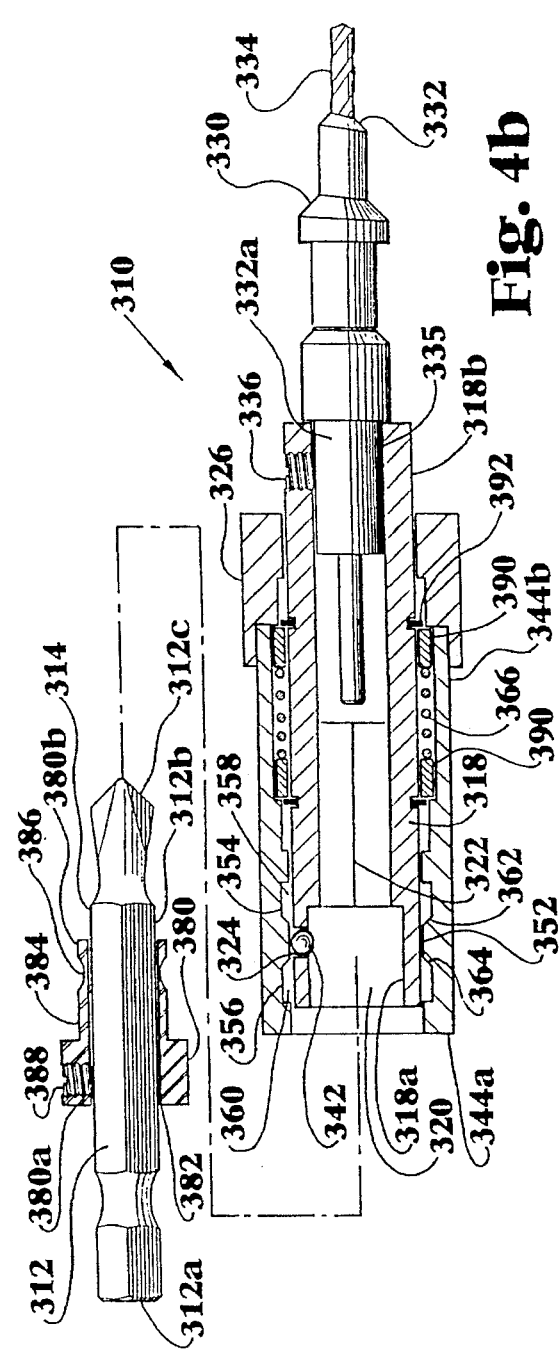

Referring now to FIGS. 4a and 4b, the adapter 310 in accordance with the fourth preferred embodiment is similar to the adapter 110 shown in connection with FIGS. 2a and 2b in accordance with the second preferred embodiment, except that the adapter 310 includes a base sleeve 380 having a first end 380a and a second end 380b. The first end 380a includes an opening 382 for accessing a cavity 384 within the base sleeve 380. The cavity 384 securely receives at least a portion of the first bit 312. The base sleeve 380 has an outer periphery which includes a recess 386, which is similar to the recess 16 in the first bit 12 of the first preferred embodiment. The first end 380a of the base sleeve 380 includes a set screw 388 for securely retaining the first bit 312 within the cavity 384 of the base sleeve 380.

The base sleeve 380 allows the adapter 310 to be quickly connected and disconnected to a first bit 312 which does not include a recess for receiving the locking ball 342. That is, the base sleeve 380 merely provides the first bit 312 with a recess for the adapter 310 to cooperate with.

The fourth preferred embodiment also discloses the use of a single coil spring 366 disposed between a pair of annular bushings 390 which are retained by a pair of spring clips or washers 392 which limit the range of movement of the bushings 390 with respect to the inner sleeve 318. As a result of the cooperation of the first coil spring 366, the annular bushings 390, the spring clips 392 and the outer sleeve 344, the outer sleeve 344 is biased towards the first position with respect to the inner sleeve 318.

Referring now to FIGS. 5a and 5b, there is shown an adapter 410 in accordance with a fifth preferred embodiment which is generally identical to the adapter 310 in accordance with the fourth preferred embodiment and the adapter 110 in accordance with the second preferred embodiment. That is, the adapter 410 in accordance with the fifth preferred embodiment is generally identical to the adapter 110 in accordance with the second preferred embodiment except for the use of the base sleeve 380, as described above in connection with the adapter 310 and in accordance with the fourth preferred embodiment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A power tool adapter for being quickly connected and disconnected to a first power driven rotary drive bit, the first drive bit having an outer periphery, said power tool adapter comprising:

a. an inner sleeve having a first end and a second end, said first end including an opening for accessing a cavity within said inner sleeve, said sleeve including at least one radially extending opening, said cavity being sized to complementarily receive at least a portion of the first drive bit, said first drive bit including a keyed portion which is rotatably fixed to a complementarily shaped portion of said inner sleeve, said second end of said inner sleeve having a second rotary cutting bit secured thereto;

b. a locking mechanism operatively engaged with said inner sleeve; and c. an outer sleeve having a cavity slidably receiving at least a portion of said inner sleeve therein, said outer sleeve being movable from a first position, wherein said outer sleeve maintains the locking mechanism in engagement with the first drive bit to lock the first drive bit to said inner sleeve, in a first direction to a second position wherein the locking mechanism is disengaged from the first drive bit to permit the first drive bit to be removed from the cavity of the inner sleeve, and from the first position in a second direction to a third position wherein the locking mechanism is removable from the cavity of the inner sleeve to permit the first drive bit to be installed into the cavity of the inner sleeve, said outer sleeve being biased toward said first position.

2. A power tool adapter according to claim 1, further including at least one spring positioned between said inner and outer sleeves for biasing said outer sleeve toward said first position.

3. A power tool adapter according to claim 1, wherein said second rotary cutting bit is releasably secured to said inner sleeve with a set screw.

4. A power tool adapter for being quickly connected and disconnected to a first power driven rotary drive bit, the first drive bit having an outer periphery, the outer periphery including a recess, said power tool adapter comprising:

a. an inner sleeve having a first end and a second end, said first end including an opening for accessing a cavity within said inner sleeve, said sleeve including at least one radially extending opening, said cavity being sized to complementarily receive at least a portion of the first drive bit such that the radially extending opening is generally aligned with the recess in the first drive bit, said first drive bit including a keyed portion which is rotatably fixed to a complementarily shaped portion of said inner sleeve, said second end of said inner sleeve having a second rotary cutting bit secured thereto;

b. a locking ball radially and slidably disposed within said radially extending opening; and c. an outer sleeve having a cavity slidably receiving at least a portion of said inner sleeve therein, said outer sleeve being movable from a first position, wherein said outer sleeve maintains the locking ball in a radially inward position with respect to said inner sleeve such that the locking ball is positioned within the recess of the first drive bit, in a first direction to a second position wherein the locking ball is permitted to move to a radially outward position with respect to said inner sleeve to permit the locking ball to be positioned away from the recess of the first drive bit, and from the first position in a second direction to a third position wherein the locking ball is permitted to move to a radially outward position with respect to said inner sleeve to permit the locking ball to be positioned outwardly from the cavity of the inner sleeve when the first drive bit is installed into the cavity of the inner sleeve, said outer sleeve being biased toward said first position.

5. A power tool adapter according to claim 4, further including at least one spring positioned between said inner and outer sleeves for biasing said outer sleeve toward said first position.

6. A power tool adapter according to claim 4, wherein said second rotary cutting bit is releasably secured to said inner sleeve with a set screw.

7. A power tool adapter according to claim 5, wherein said cavity of said outer sleeve is defined by an internal surface within said outer sleeve, said internal surface including a locking surface, a first release surface on one side of said locking surface and a second release surface on another side of said locking surface, said locking surface being positioned radially inward with respect to said first and second release surfaces, said locking surface being aligned with said radially extending opening of said inner sleeve to maintain the locking ball in a radially inward position with respect to said inner sleeve such that the locking ball is positioned within the recess of the first drive bit when the outer sleeve is in the first position, said first release surface being aligned with said radially extending opening of said inner sleeve such that the locking ball is permitted to move to a radially outward position with respect to said inner sleeve to permit the locking ball to be positioned away from the recess of the first drive bit when the outer sleeve is in the second position, said second release surface being aligned with said radially extending opening of said inner sleeve such that the locking ball is permitted to move to a radially outward position with respect to said inner sleeve to permit the locking ball to be positioned outwardly from the cavity of the inner sleeve when the outer sleeve is in the third position.

8. A power tool adapter according to claim 7, further including a first cam surface between said first release surface and said locking surface for camming said locking ball between said radially inward and outward positions and a second cam surface between said second release surface and said locking surface for camming said locking ball between said radially inward and outward positions.

9. A power tool adapter according to claim 8, further including at least one spring positioned between said inner and outer sleeves for biasing said outer sleeve toward said first position.

10. A power tool adapter according to claim 8, wherein said second rotary cutting bit is releasably secured to said inner sleeve with a set screw.

11. A power tool adapter for being quickly connected and disconnected to a first power driven rotary drive bit, the first drive bit having an outer periphery, said power tool adapter comprising:

a. a base sleeve having a first end and a second end, said first end including an opening for accessing a cavity within said base sleeve, said cavity securely receiving at least a portion of the first drive bit, said base sleeve having an outer periphery, said outer periphery including a recess;

b. an inner sleeve having a first end and a second end, said first end of said inner sleeve including an opening for accessing a cavity within said inner sleeve, said inner sleeve including at least one radially extending opening, said cavity being sized to complementarily receive at least a portion of said base sleeve and the first drive bit such that the radially extending opening is generally aligned with the recess in the base sleeve, said first drive bit and said base sleeve being rotatably fixed to said inner sleeve, said second end of said inner sleeve for receiving a second rotary cutting bit;

c. a locking ball radially and slidably disposed within said radially extending opening; and d. an outer sleeve having a cavity slidably receiving at least a portion of said inner sleeve, base sleeve and said first drive bit therein, said outer sleeve being movable from a first position, wherein said outer sleeve maintains the locking ball in a radially inward position with respect to said inner sleeve such that the locking ball is positioned within the recess of the first drive bit, in a first direction to a second position wherein the locking ball is permitted to move to a radially outward position with respect to said inner sleeve to permit the locking ball to be positioned away from the recess of the base sleeve, and from the first position in a second direction to a third position wherein the locking ball is permitted to move to a radially outward position with respect to said inner sleeve to permit the locking ball to be positioned outwardly from the cavity of the inner sleeve when the first drive bit is installed in the inner sleeve, said outer sleeve being biased toward said first position.

12. A power tool adapter according to claim 11, further including at least one spring positioned between said inner and outer sleeves for biasing said outer sleeve toward said first position.

13. A power tool adapter according to claim 11, wherein the second rotary cutting bit is releasably secured to said second end of said inner sleeve.

14. A power tool adapter according to claim 13, wherein said second rotary cutting bit is releasably secured to said inner sleeve with a set screw.

15. A power tool adapter according to claim 11, wherein said cavity of said outer sleeve is defined by an internal surface within said outer sleeve, said internal surface including a locking surface, a first release surface on one side of said locking surface and a second release surface on another side of said locking surface, said locking surface being positioned radially inward with respect to said first and second release surfaces, said locking surface being aligned with said radially extending opening of said inner sleeve to maintain the locking ball in a radially inward position with respect to said inner sleeve such that the locking ball is positioned within the recess of the first drive bit when the outer sleeve is in the first position, said first release surface being aligned with said radially extending opening of said inner sleeve such that the locking ball is permitted to move to a radially outward position with respect to said inner sleeve to permit the locking ball to be positioned away from the recess of the first drive bit when the outer sleeve is in the second position, said second release surface being aligned with said radially extending opening of said inner sleeve such that the locking ball is permitted to move to a radially outward position with respect to said inner sleeve to permit the locking ball to be positioned outwardly from the cavity of the inner sleeve when the outer sleeve is in the third position.

16. A power tool adapter according to claim 15, further including a first cam surface between said first release surface and said locking surface for camming said locking ball between said radially inward and outward positions and a second cam surface between said second release surface and said locking surface for camming said locking ball between said radially inward and outward positions.

17. A power tool adapter according to claim 15, further including at least one spring positioned between said inner and outer sleeves for biasing said outer sleeve toward said first position.

18. A power tool adapter according to claim 15, wherein the second rotary cutting bit is releasably secured to said second end of said inner sleeve.

19. A power tool adapter according to claim 18, wherein said second rotary cutting bit is releasably secured to said inner sleeve with a set screw.

\* \* \* \* \*